UNITED STATES PATENT OFFICE 3,035,053
Patented May 15, 1962

3,035,053
TRIS-AMINOMETHYLPHOSPHINES
Harold Coates, Womburn, and Pete Albert Theodore
Hoye, Ashford, England, assignors, by mesne assignments, to Albright & Wilson (Mfg.) Limited, Birmingham, England, a British company
No Drawing. Filed July 13, 1956, Ser. No. 597,570
Claims priority, application Great Britain July 19, 1955
8 Claims. (Cl. 260—247.5)

This invention relates to the production of a new series of organic phosphines and has for an object to provide substances useful as intermediates in chemical synthesis, and as starting materials in the production of flame-resistant plastics, surface coatings, flameproof textiles and insecticides.

In a recent British patent, Serial No. 761,985, filed jointly by ourselves and The Bradford Dyers Association Limited, it has been shown that it is possible to obtain polymeric phosphorus-containing products by the reaction of a tetrakis-hydroxymethyl-phosphonium salt with a primary amine.

We have now found that by carrying out the reaction of a hydroxymethyl phosphonium salt, either substituted or unsubstituted, as described below, with a primary or secondary amine which is present in appreciable excess, preferably at least 4.5 moles per mole of salt, a monomeric product is obtained which is an aminomethyl phosphine derivative.

The hydroxymethyl phosphonium salt has the general formula:

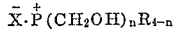

Where $n$ is 2, 3 or 4, R is an alkyl, aralkyl, aryl or heterocyclic radical and X is the cation of an acid. When $n=2$ so that there are two R radicals, they may be alike or different. Hereinafter the abbreviation RHP will be used to denote the above hydroxymethyl phosphonium radical. The amine has the general formula: NHR'R". Where R' is an alkyl, aralkyl, aryl or heterocyclic radical and R" is an alkyl, aralkyl, aryl, heterocyclic radical or a hydrogen atom.

There is a good yield of the product from the above reaction of the RHP salt with the amine, the formula of which is:

$$P(CH_2NR'R'')_{n-1} \cdot R_{4-n}$$

in which R, R', R" and $n$ have the significance above set forth. The reaction may be expressed:

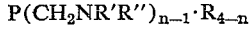
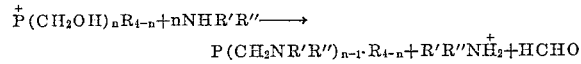

It is possible, alternatively, to use one mole of an alkali hydroxide or an organic tertiary base, such as triethanolamine, in place of one of the moles of the primary or secondary amine in the above reaction.

The general reaction may then be expressed:

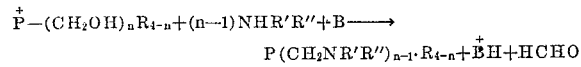

Where B is an organic or an inorganic base.

Examples of suitable amines are methylamine, ethylamine, propylamine, allylamine, butylamine, cyclohexylamine, dimethylamine, diethylamine, dibutylamine, diallylamine, morpholine.

In accordance with the present invention monomeric aminomethyl phosphine derivatives are produced by the interaction of an RHP salt with either a primary or secondary amine present in appreciable excess or alternatively with a primary or secondary amine, present in at least the calculated quantity with respect to the hydroxymethyl groups in said salt, together with one mole of an organic or inorganic base.

We have found that the above-mentioned aminomethyl phosphine derivatives are very reactive towards compounds containing a reactive hydrogen atom and react with these latter compounds as phosphorus-containing Mannich bases.

Further in accordance with the present invention therefore, the monomeric aminomethyl phosphine derivatives are reacted, as phosphorus-containing "Mannich bases," with compounds containing an activated hydrogen atom to give material containing phosphorus-carbon linkages. Examples of suitable compounds containing a reactive hydrogen atom are ethyl acetoacetate, dialkyl phosphites, hydroquinone, p-cresol, phenol, and diphenylol propane. The products from these reactions may be useful in connection with the preparation of insecticides, hydraulic fluids, lubricant additives, plastics, plasticisers and surface-active agents.

We have further found that the reactivity and solubility characteristics of aminomethyl phosphine derivatives may readily be altered by oxidation or sulphurisation to the corresponding phosphine oxide or phosphine sulphide.

Further in accordance with the present invention, therefore, the monomeric aminomethyl phosphine derivatives are reacted with oxygen or sulphur to give the corresponding oxide or sulphide.

The most convenient manner of preparing the said aminomethyl phosphine derivatives consists in reacting a solution of an RHP salt (as above described), such as the chloride, with a solution of the organic amine, using a molar ratio of amine to RHP salt of 4:1 or more, preferably in the region of 4.5:1. Alternatively, one may use one mole of an inorganic base, such as sodium hydroxide, or of an organic tertiary base, such as triethanolamine, and three or more moles of the primary or secondary amine. Water is usually the preferred inert solvent but the lower aliphatic alcohols, such as methanol and ethanol, may also be used. The reaction is preferably carried out in an inert atmosphere, such as nitrogen, since the phosphine derivatives are very readily oxidised. The products may be conveniently separated from the aqueous reaction system by extraction with an inert solvent, such as benzene.

The preparation of the phosphine oxides may be carried out either by direct oxidation with elemental oxygen, for example, by passing oxygen or air through a gas distributor into the phosphine with vigorous stirring and cooling until the oxidation is complete or by reaction of the phosphine in aqueous suspension with hydrogen peroxide solution or other suitable oxidising agent. The phosphine sulphide may be prepared by direct reaction with sulphur, for example, by treating the phosphine with the calculated quantity of finely divided sulphur either alone or in the presence of an inert solvent. This reaction is exothermic and often very vigorous.

The reaction of the aminomethyl phosphine derivatives with the compounds containing a reactive hydrogen atom is brought about by heating the materials together in the required molecular proportions, with or without an inert organic solvent, at a temperature of the order of 120° C., the exact temperature depending upon the reactivities of the two compounds.

The following examples, in which parts and percentages are quoted by weight, are given to illustrate the invention and the manner of carrying it into effect:

*Example 1.*—A solution of tetrakishydroxymethylphosphonium chloride (hereinafter shortly referred to as THPC) (971 parts, 5.1 moles) in water (2000 parts) was treated with good agitation and cooling in an atmosphere of nitrogen with diethylamine (1708 parts, 23.4 moles equal to 4.59 moles per mole THPC). The temperature was kept below 40° C. The product, which separated as an oily layer above the aqueous solution, was extracted with benzene (800 parts) and the extract dried over sodium sulphate. Evaporation of the benzene under reduced pressure and distillation of the residue in vacuo give 1130 parts of tris-diethylaminomethylphosphine B.P. 131°/0.2 mm. This corresponds to a yield of 76.5% theoretical, based on THPC.

The product is a clear, colourless liquid, soluble in organic solvents but sparingly soluble in water. Analysis: Found N=14.23%. Calculated (for $P(CH_2N(C_2H_5)_2)_3$) N=14.53%.

Titration of a sample of the phosphine with standard iodine in acid solution gave a molecular weight of 286. Calculated 289.

*Example 2.*—Di-n-butylamine (516 parts, 4 moles) was added to a solution of THPC (190.5 parts, 1 mole) in water (750 parts) at room temperature contained in a 2-litre separating funnel in a nitrogen atmosphere. The mixture was shaken vigorously and the temperature rose to 50° C. After allowing to cool to room temperature, the mixture consisted of an upper layer of product and a lower aqueous layer. The mixture was extracted with benzene (240 parts) and the extract dried over anhydrous sodium sulphate. Evaporation and vacuum distillation under nitrogen as in Example 1 gave 332 parts tris-di-n-butylaminomethylphosphine B.P. 190–192°/0.4 mm. soluble in hydrocarbon solvents, insoluble in water. Analysis: Found N=8.92%. Calculated (for $P(CH_2N(C_4H_9)_2)_3$)

N=9.18%.

*Example 3.*—A solution of THPC (188 parts, 0.985 mole) and triethanolamine (147 parts, 0.985 mole) in water (750 parts) in a 2-litre separating funnel was cooled to 10° C. under nitrogen and morpholine (287 parts, 3.3 moles) added. The mixture was shaken thoroughly, cooled to room temperature and sodium chloride (200 parts) added. The mixture was extracted three times with benzene (120 parts per extraction). After drying and evaporating the solvent, the product was obtained as an almost colourless oil which crystallised on cooling. This material was distilled in vacuo B.P. 200–201°/0.5 mm. with slight decomposition. The distillate crystallised on cooling and was recrystallised from a mixture of alcohol and ether giving colourless crystals M.P. 57° C. Analysis: Found N=12.51%. Calculated (for $P(CH_2NC_4H_8O)_3$)

N=12.67%.

*Example 4.*—A solution of tetrakis-hydroxymethylphosphonium acetate (hereinafter shortly referred to as THPA) (503 parts, 2.35 moles) in water (2000 parts) was treated with shaking under nitrogen with diethylamine (784 parts, 10.74 moles). The temperature rose to 60° C. after the addition. The product was extracted and distilled as in Example 1, and gave 561 parts of tris-diethylaminomethylphosphine, equivalent to a yield of 82.3% of theoretical based on THPA.

*Example 5.*—Hydrogen peroxide (180 parts of 100 volumes) was added dropwise, with good stirring, to a suspension of tris-diethylaminomethylphosphine (135 parts) in water (300 parts) under nitrogen. The reaction temperature was kept between 10 and 20° C. The water-soluble product was salted out with sodium chloride and extracted twice with benzene (80 parts per extraction). The extract was dried over anhydrous magnesium sulphate and the solvent removed under vacuum giving a colourless oil (135 parts) which crystallised readily on cooling. M.P. 67° C. Analysis: Found N=13.42%. Calculated (for $O:P(CH_2N(C_2H_5)_2)_3$) N=13.85%. The product is soluble in hydrocarbons, alcohols and water.

*Example 6.*—A mixture of tris-diethylaminomethylphosphine (15 parts, 0.052 mole) and ethyl acetoacetate (20.2 parts, 0.156 mole) were heated together in a distillation apparatus in an atmosphere of nitrogen at 130° C.

(oil bath). Reaction occurred readily and diethylamine distilled off, about two-thirds of the theoretical quantity of diethylamine distilling over in 15 minutes. The temperature of the oil bath was raised to 150° C. during a further 15 minutes, after which distillation ceased. 92% of the theoretical diethylamine was collected.

The reaction product was a yellow oils liquid (26.5 parts) which could not be distilled without decomposition. This product is believed to be

$P(CH_2CH(COCH_3)CO_2C_2H_5)_3$

*Example 7.*—A mixture of tris-diethylaminomethylphosphine (21.2 parts, 0.073 mole) and ethyl acetoacetate (9.5 parts, 0.073 mole) in a distillation apparatus under nitrogen was heated to approximately 130° C. The theoretical quantity of diethylamine was distilled off in 10 minutes leaving a colourless oil (25 parts) which was believed to consist essentially of

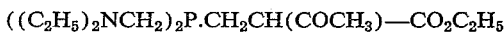
$((C_2H_5)_2NCH_2)_2P.CH_2CH(COCH_3)—CO_2C_2H_5$

*Example 8.*—A mixture of tris-diethylaminomethylphosphine (23 parts, 0.0795 mole) and ethyl acetoacetate (10.5 parts, 0.0807 mole) were reacted as in Example 7. The product was mixed with 50 parts cold water and oxidised by adding hydrogen peroxide (25 parts 100 volumes). The product was extracted with benzene, the extract dried over anhydrous sodium sulphate and the benzene evaporated on the steam bath under reduced pressure. The phosphine oxide was obtained as a pale yellow viscous liquid which melted at approximately −10° C. Analysis: Found N=7.81%. Calculated

(for $(C_2H_5)_2NCH_2)_2P(O)CH_2CH(COCH_3)CO_2C_2H_5$.)

N=7.75%.

*Example 9.*—A mixture of tris-diethylaminomethylphosphine (hereinafter shortly referred to as TDEP) (21.2 parts, 0.073 mole) and diethyl phosphite (10 parts, 0.0725 mole) was heated under nitrogen in a distillation apparatus. A vigorous reaction set in at 180° C. and diethylamine distilled off. Heating was continued for a further 30 minutes to a temperature of 240° C. The calculated amount of diethylamine was recovered. 25 parts of a brown liquid product were obtained which was believed to consist mainly of

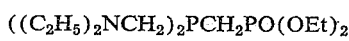
$((C_2H_5)_2NCH_2)_2PCH_2PO(OEt)_2$

*Example 10.*—A mixture of TDEP (13.5 parts, 0.0466 mole) and p-cresol (14.4 parts, 0.133 mole) was heated as in previous examples. At 120° C. a vigorous reaction set in and approximately two-thirds of the theoretical quantity of diethylamine distilled off spontaneously. Gentle heating was continued until no more diethylamine was distilled (30 minutes); 90% of the theoretical diethylamine was collected. The product (18.5 parts) was an almost colourless, very viscous liquid, soluble in benzene and alcohol. From the latter it crystallised as a white sticky solid on cooling.

*Example 11.*—TDEP (9 parts, 0.031 mole) and hydroquinone (5.13 parts, 0.0466 mole) were gently heated together under nitrogen to give a clear liquid. On further heating to 100–120° C. a reaction set in with evolution of diethylamine. After the evolution of amine had ceased, the mixture was heated for a further 10 minutes at 150° C. The product when cold was a hard, clear, brittle resin which is sticky at 100° C. and does not burn.

*Example 12.*—A mixture of TDEP (9 parts, 0.031 mole) and p-cresol (3.5 parts, 0.0324 mole) were heated together in an oil bath at 120–40° for 15 minutes. The theoretical quantity of diethylamine was evolved. The almost colourless product was allowed to cool and hydroquinone (3.43 parts, 0.031 mole) added. The mixture was then reheated at 120° to 124° C. for 15 minutes and gave a clear, red, viscous liquid. When cold the product was a hard resin, less brittle than the product from Example 11. The product had good adhesion to glass.

*Example 13.*—A mixture of TDEP (8 parts, 0.0277 mole) and diphenylolpropane (3.1 parts, 0.0136 mole) was warmed gently to effect solution and then heated to 155° C. in an oil bath. Diethylamine was evolved freely. The temperature was raised to 185° C. during 10 minutes and kept at this value for a further 5 minutes. The product was a hard, clear, very pale yellow resin which would not burn. This material had a slight phosphine-like odour.

The polymer was powdered and allowed to stand overnight in a 5% solution of hydrogen peroxide, washed with water and dried. The product no long had a phosphine odour.

The polymer is hard at 120° C.

*Example 14.*—Tris-di - n - butylaminomethylphosphine (20 parts, 0.044 mole) and diphenylolpropane (5 parts, 0.022 mole) were heated together at 190° C. for 15 minutes. The dibutylamine was removed under reduced pressure and the residue heated for a further 15 minutes at 190° C. under vacuum.

The product when cold was a hard, opaque, pale yellow solid.

*Example 15.*—Tris - morpholinomethylphosphine (15.5 parts, 0.045 mole) and hydroquinone (7.75 parts, 0.07 mole) were heated in an oil bath at 190° C. for 45 minutes. A clear solution was obtained after 5 minutes. The morpholine was removed under reduced pressure and the product heated for a further 15 minutes at 190° C. in vacuum (12 mms.).

The product was liquid at 190° C. When cold it was a clear, brittle, pale yellow resin which would not burn.

What we claim is:

1. A monomeric compound of the formula $$P(CH_2NR'R'')_3$$

wherein NR'R" is a member selected from the group consisting of methylamino, ethylamino, propylamino, allylamino, butylamino, cyclohexylamino, dimethylamino, diethylamino, dibutylamino, diallylamino and morpholino.

2. Monomeric tris-loweralkylaminomethyl phosphine.
3. Monomeric tris-diloweralkylaminomethyl phosphine.
4. A process for the production of monomeric substituted organic phosphine derivatives which comprises reacting (a) a hydroxymethyl phosphonium salt of a nonoxidizing acid with (b) a secondary amine, the molar ratio of secondary amine to phosphonium salt being at least 4 to 1.
5. Tris-allylaminomethyl phosphine.
6. Tris-cyclohexylaminomethyl phosphine.
7. Tris-diallylaminomethyl phosphine.
8. Tris-morpholinomethyl phosphine.

References Cited in the file of this patent

UNITED STATES PATENTS

| | | |
|---|---|---|
| 2,668,096 | Reeves et al. | Feb. 2, 1954 |
| 2,809,941 | Reeves et al. | Oct. 15, 1957 |

FOREIGN PATENTS

| | | |
|---|---|---|
| 578,724 | Great Britain | July 9, 1946 |

OTHER REFERENCES

Kosolapoff: Organo-phosphorus Compounds (1950), pp. 84–6.